(12) United States Patent
Kooi et al.

(10) Patent No.: US 6,168,229 B1
(45) Date of Patent: Jan. 2, 2001

(54) VEHICLE CAB SUSPENSION

(75) Inventors: David S. Vander Kooi, Sioux Center; Richard R. Schwanke, Rock Valley, both of IA (US)

(73) Assignee: Link Mfg., Ltd., Sioux Center, IA (US)

( * ) Notice: Under 35 U.S.C. 154(b), the term of this patent shall be extended for 0 days.

(21) Appl. No.: 09/370,348

(22) Filed: Aug. 6, 1999

Related U.S. Application Data

(63) Continuation of application No. 09/228,691, filed on Jan. 12, 1999.

(51) Int. Cl.[7] .................................................. B62D 24/04
(52) U.S. Cl. ................................ 296/190.07; 296/35.1; 296/190.05
(58) Field of Search ........................... 296/35.1, 190.04, 296/190.05, 190.07, 190.06; 180/89.13, 89.14

(56) References Cited

U.S. PATENT DOCUMENTS

| | | |
|---|---|---|
| 3,129,973 | 4/1964 | Maruhn . |
| 3,380,773 * | 4/1968 | Sewelin ........................... 296/190.07 |
| 3,393,005 | 7/1968 | Herrmann et al. . |
| 3,508,784 | 4/1970 | Small . |
| 3,847,492 | 11/1974 | Kennicutt et al. . |
| 3,882,956 | 5/1975 | Plegat . |
| 3,985,385 | 10/1976 | Kennicutt et al. . |
| 4,014,588 | 3/1977 | Kohriyama . |
| 4,438,970 | 3/1984 | Baucher . |
| 5,024,283 | 6/1991 | Deli . |
| 5,031,885 | 7/1991 | Schwerdt . |
| 5,118,087 | 6/1992 | Jordens et al. . |
| 5,368,118 | 11/1994 | Hoefle . |
| 5,654,100 | 8/1997 | Kobler et al. . |

FOREIGN PATENT DOCUMENTS

| | | | |
|---|---|---|---|
| 497189 | 4/1930 | (DE) . | |
| 497189 * | 5/1930 | (DE) ................................... | 296/35.1 |
| 28055 | 3/1981 | (JP) . | |

\* cited by examiner

*Primary Examiner*—Dennis H. Pedder
(74) *Attorney, Agent, or Firm*—Zarley, McKee, Thomte, Voorhees & Sease; Dennis L. Thomte

(57) ABSTRACT

A cab suspension for a vehicle having a chassis supporting a cab with the cab being supported on the chassis at a forward location and at a rearward location so as to permit vertical movement of the rearward end of the cab relative to the chassis. Conventional forward support structures connect the forward end of the cab to the chassis. A rearward support structure or suspension unit connects the cab to the chassis at the rearward end of the cab to provide relative vertical movement therebetween. The structure comprises an elongated metal tube having its longitudinal axis disposed transversely with respect to the longitudinal axis of the chassis with the tube being secured to the chassis. The tube has an elongated, resilient rubber or elastomeric cartridge positioned therein which has an elongated torsion bar extending therethrough which is in engagement therewith so that the cartridge restricts rotational movement of the torsion bar with respect to the tube. Lever arms are fixedly secured to the ends of the torsion bar and extend forwardly therefrom for adjustable connection to a bracket which is secured to the lower rearward end of the vehicle cab.

18 Claims, 6 Drawing Sheets

VEHICLE CAB SUSPENSION

CROSS-REFERENCE TO RELATED APPLICATION

This is a continuation application of Petitioners' earlier application Ser. No. 09/228,691 filed Jan. 12, 1999, entitled A VEHICLE CAB SUSPENSION.

BACKGROUND OF THE INVENTION

1. Field of the Invention

This invention relates to a vehicle cab suspension and more particularly to a vehicle cab suspension for resiliently or flexibly supporting the rearward end of the truck cab or the like.

2. Description of the Invention

Many vehicle cab suspensions have been previously provided for supporting a vehicle cab on the chassis of the vehicle whereby a cushioning or shock absorber effect is achieved to provide a more comfortable ride for the occupants of the cab. Although the prior art vehicle cab suspensions have apparently met with some success, the previous vehicle cab suspensions do have certain drawbacks or disadvantages associated therewith. First, many of the prior art vehicle cab suspensions are extremely complicated and expensive. Further, the large number of moving parts of the prior art suspension systems results in greater maintenance and replacement costs. Third, some of the prior art cab suspension systems do not have adequate adjustment means associated therewith for adjusting the damping characteristics of the system. Yet another disadvantage of certain of the prior art suspension systems is that the damping mechanisms thereof do not provide any lateral control of the cab, with respect to the chassis, which requires that a separate component be utilized in the standard cab suspensions to control lateral movement of the cab relative to the chassis.

SUMMARY OF THE INVENTION

A cab suspension for a vehicle having an elongated chassis or frame which supports a cab thereon so as to permit vertical movement of the rearward end of the cab relative to the chassis. A conventional forward support structure pivotally connects the cab to the chassis at a forward location in conventional fashion. The suspension system of this invention includes rearward support structure which connects the rearward end of the cab to the chassis and may either consist of a single unit at the center of the rearward portion of the cab or a unit secured to each of the opposite rear corners of the cab. The rearward support structure comprises an elongated square metal housing in the form of a tube having its longitudinal axis disposed transversely with respect to the longitudinal axis of the chassis. The metal housing is secured to the frame rails of the chassis or to a cross-member extending between the frame rails. The metal housing has an elongated, resilient rubber or elastomeric cartridge positioned therein which has an elongated torsion bar extending therethrough, and bonded thereto, whereby the cartridge resists rotational movement of the torsion bar with respect to the housing. The torsion bar has opposite end portions positioned outwardly of the opposite ends of the housing and a lever arm is secured to each end of the torsion bar and extends forwardly therefrom. The forward ends of the lever arms are vertically adjustably secured to the cab.

A modified form of the invention is also disclosed wherein the lever arms extend rearwardly from the torsion bar and have adjustable turnbuckles connected thereto which extend to a bracket secured to the cross-member on the frame. A shock absorber is also provided in this embodiment.

Yet another embodiment is also disclosed wherein the housing which supports the torsion bar is operatively hingedly secured to the cab. A pair of lever arms extend rearwardly from the torsion bar and are operatively connected to the truck frame by means of a bracket. One or more shock absorbers extend between the housing and the bracket connected to the truck frame.

A principal object of the invention is to provide a vehicle cab suspension which is compact.

Yet another object of the invention is to provide a vehicle cab suspension having a minimum of moving parts.

Yet another object of the invention is to provide a vehicle cab suspension having adjustable load ranges.

Still another object of the invention is to provide a vehicle cab suspension which is less expensive to fabricate than existing vehicle cab suspensions.

Still another object of the invention is to provide a vehicle cab suspension having increased isolation performance characteristics compared to existing designs.

Yet another object of the invention is to provide a vehicle cab suspension which also acts as a lateral control member.

Yet another object of the invention is to provide a vehicle cab suspension which may either be mounted at the center of the rearward end of the cab or at the rear corners of the cab.

These and other objects will be apparent to those skilled in the art.

DESCRIPTION OF THE PREFERRED EMBODIMENT

Figure 1:
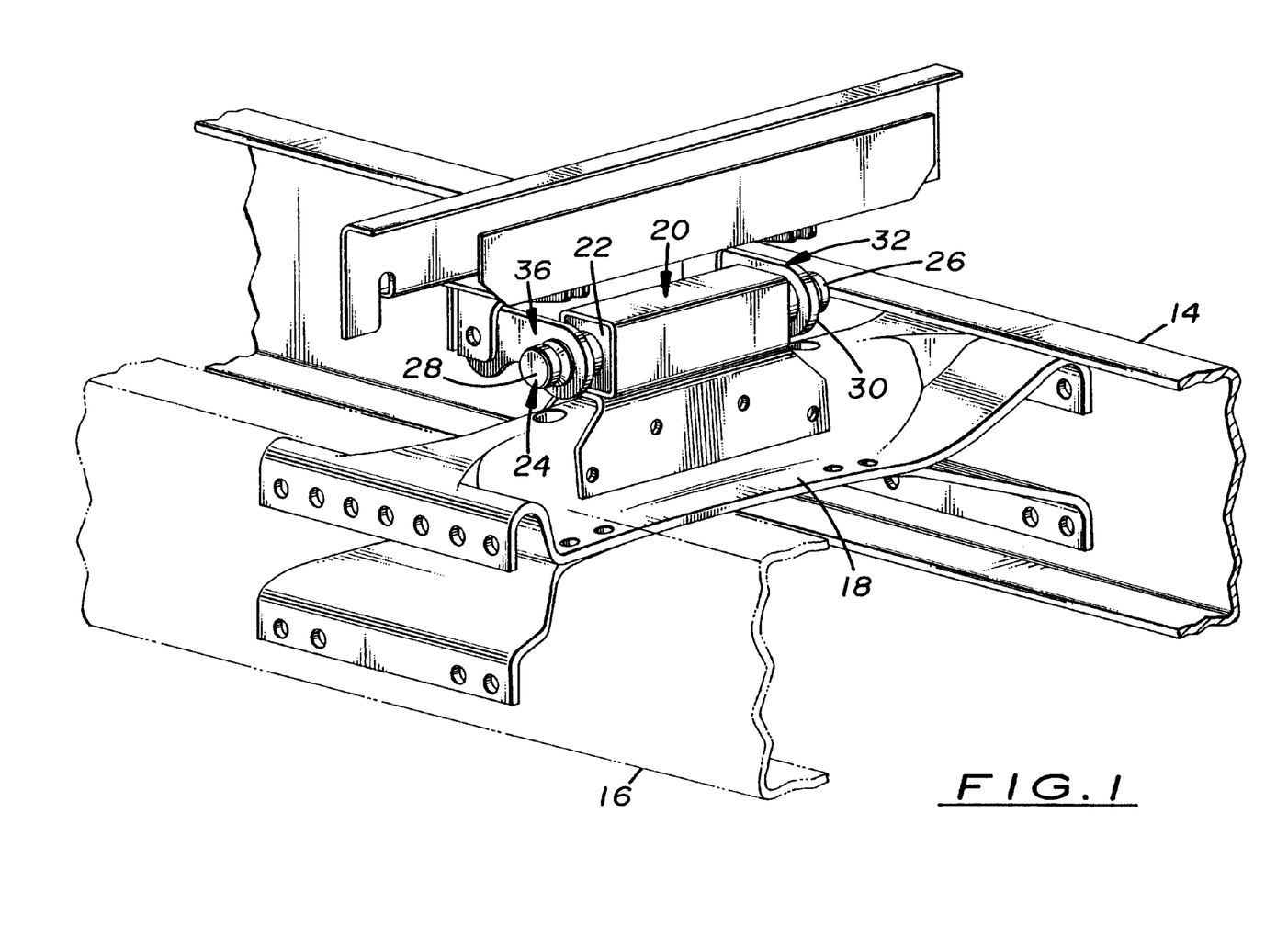
FIG. 1 is a rear perspective view of the suspension system of this invention.

The suspension system of this invention is referred to generally by the reference numeral 10 and is designed to be used at the rearward end of a vehicle cab 12 to provide relative vertical movement therebetween. Normally, the forward end of the cab is pivotally secured to the chassis at a pair of spaced-apart locations whereby the cab may pivot, about a horizontal axis, with respect to those pivot locations. The vehicle upon which the cab 12 is mounted normally consists of a pair of frame rails 14 and 16 having one or more cross-members 18 extending therebetween. In those instances when the vehicle does not include a cross-member at the rearward end of the cab, such as cross-member 18, it is recommended that a cross-member be secured to and extended between the frame rails 14 and 16, as seen in the drawings, for supporting the suspension system 10 at the center thereof. When a single suspension system 10 is being utilized, the suspension system would be mounted on and supported at the center of the cross-member 18, as seen in FIG. 1. If a suspension system 10 is going to be used at each of the rearward corners of the cab, a suspension system or unit 10 would be supported on and secured to each of the frame rails 14 and 16.

Figure 2:
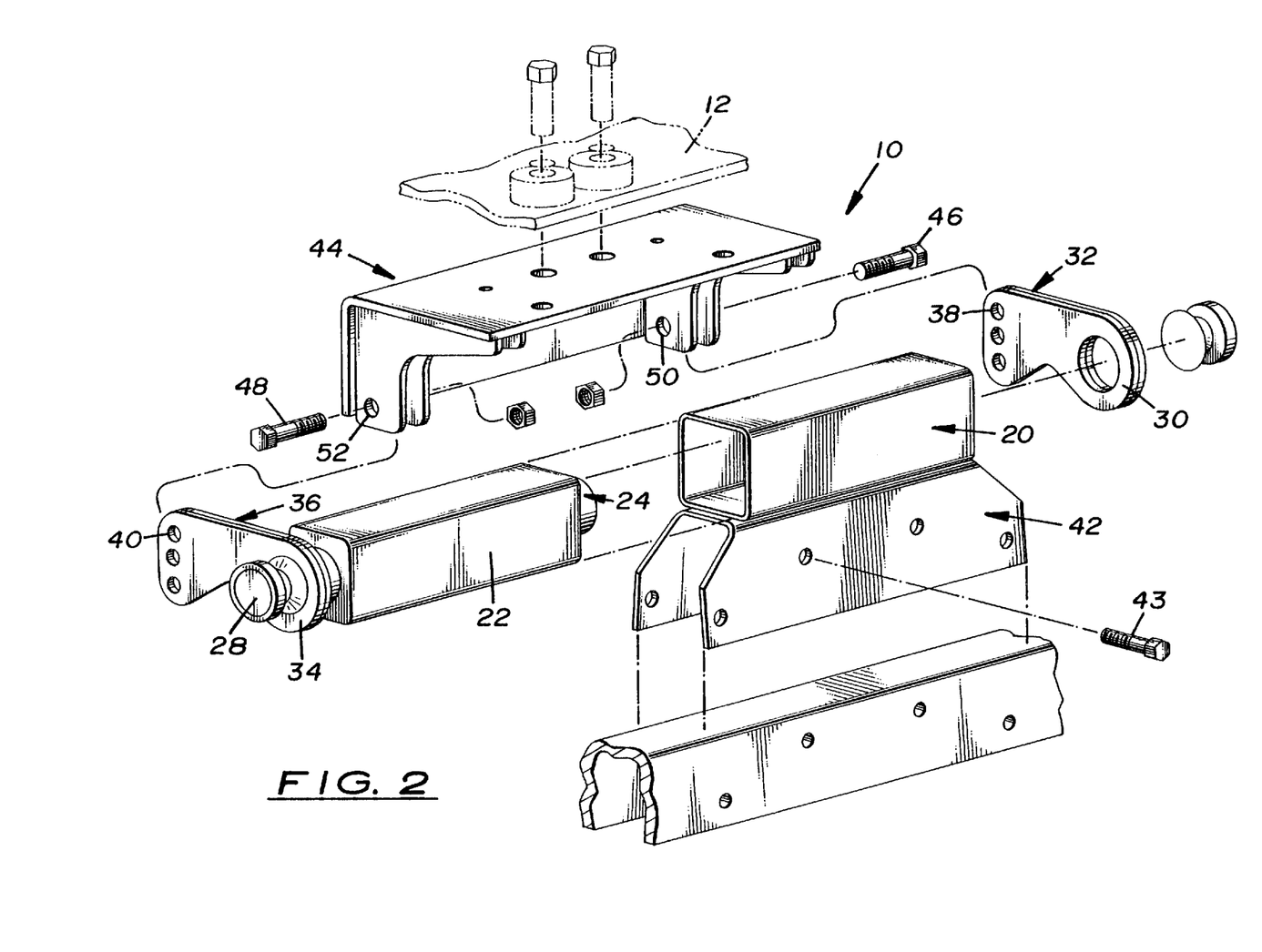
FIG. 2 is an exploded perspective view of the suspension system of this invention.
Figure 3:
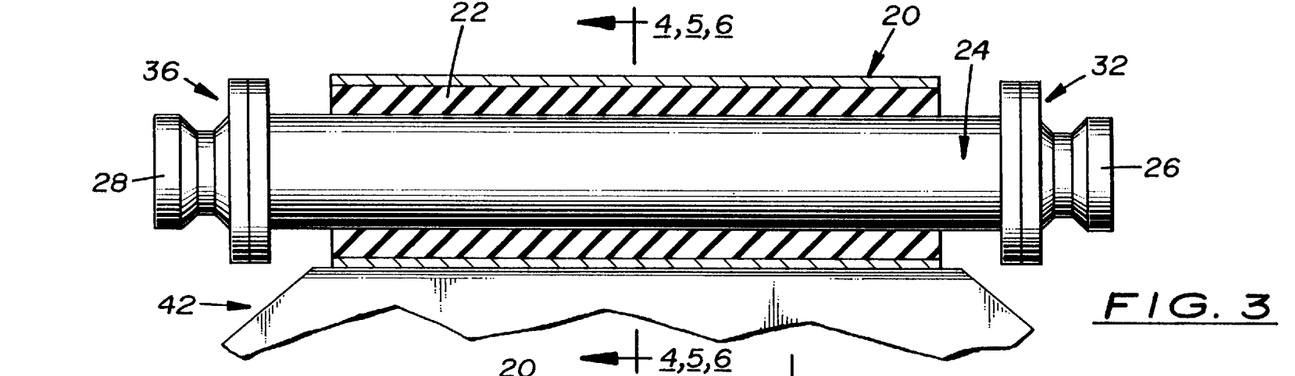
FIG. 3 is a partial longitudinal sectional view of a portion of the invention.
Figure 4:
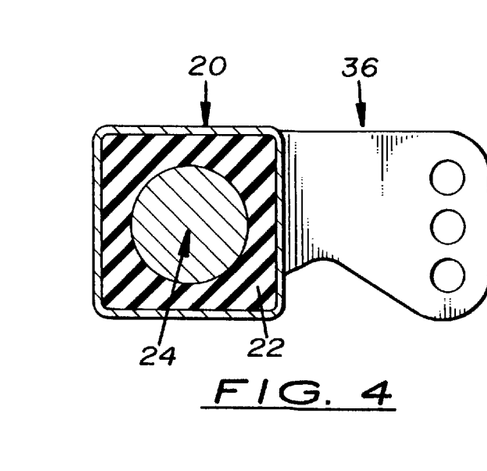
FIG. 4 is a sectional view as seen along lines 4—4 of FIG. 3.
Figure 5:
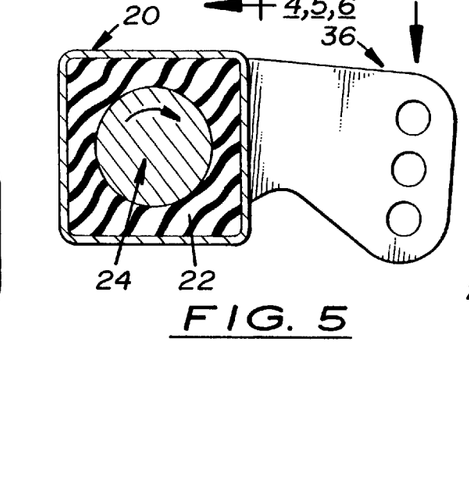
FIG. 5 is a sectional view seen on lines 5—5 of FIG. 4 illustrating the lever arm being moved downwardly with respect to the torsion member.
Figure 6:
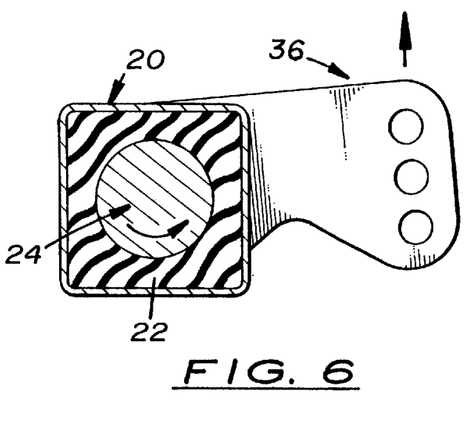
FIG. 6 is a sectional view seen on lines 6—6 of FIG. 3 illustrating the lever arm being moved upwardly with respect to the torsion member.

Suspension system 10 includes an elongated generally square metal tube or housing 20 having a rubber or elastomeric cartridge 22 positioned therein. An elongated torsion bar 24 extends through the rubber cartridge 22 and has its opposite ends 26 and 28 positioned outwardly of the outer ends of the tube or housing 20. The forming and assembly of cartridge 22, torsion bar 24 and housing 20 is as follows. The torsion bar 24 is placed in a mold and a bonding material is applied thereto. The cartridge 22 is then formed around the bar 24 with the cartridge adhering or bonding to the bar 24. The dimension of the cartridge 22 is such that it can be pushed or inserted into the housing 20. The rearward end 30 of lever arm 32 is fixedly secured to one end of torsion bar 24, by welding or the like, and extends forwardly therefrom. The rearward end 34 of lever arm 36 is fixedly secured to end 28 of torsion bar 24, by welding or the like, and extends transversely forwardly therefrom. As seen in the drawings, the forward end of lever arm 32 has a plurality of vertically spaced adjustment openings 38 formed therein and the forward end of lever arm 36 has a plurality of vertically spaced adjustment openings 40 formed therein.

Bracket 42 is secured to the underside of housing 20 and is secured to the cross-member 18 by bolts 43 or the like at the center thereof if a single suspension unit is being utilized. If a suspension unit is to be used at each of the rear corners of the cab, the bracket 42 will be designed so as to be able to be secured to one of the frame rails 14 or 16.

The forward ends of lever arms 32 and 36 are selectively vertically adjustably secured to bracket 44 by means of bolts 46 and 48, extending through appropriate openings 38 and 40, and through pairs of openings 50 and 52 provided on bracket 44, respectively. Bracket 44 is secured to the rearward end of cab 12 by screws, bolts, etc. The lever arms 32 and 36 connect the cartridge torsion bar 24 to the cab through the bracket 44, thereby transferring the cab load into the cartridge. The principal operation of the system of this invention is that the cab weight is applied to the cartridge through the lever arm connection which causes a torque on the cartridge, due to the moment of the applied load, and the resulting counteractive force of the rubber cartridge element 22 provides the lift for the truck cab. Loading the rubber cartridge 22 in torsion places the rubber material of the cartridge in shear which provides a lower spring rate, increasing the isolation performance compared to other rubber designs. Since there is no relative movement between the rubber cartridge element 22 and the metal surfaces of the tube 20, wear and abrasion between moving parts is eliminated.

Load ranges may be adjusted for in two different ways: by decreasing or increasing the amount of rubber that is captured in the housing 20, or by using the adjustment holes 38 and 40 in the forward ends of the lever arms 32 and 36, respectively. The suspension travel and load rating of the cartridge 22 may also be modified by using varying lengths of the lever arms.

The suspension system of this invention allows the use of fewer suspension components with essentially the same ride evaluation as other types of suspension systems, both objectively and subjectively, resulting in a considerable lower cost for the unit as well as a more compact suspension that offers space savings.

Since the rubber element or cartridge 22 itself contains certain damping characteristics, depending on cab weight, auxiliary shock absorbers, or some other type of damping device, may be implemented if desired to control cab movement. Since the spring rate changes due to the amount of "twist" on the torsion bar, the suspension can be designed around those different rates. The resilient cartridge 22 itself also acts as the lateral control member, to prevent lateral movement between the cab and the chassis, due to its design in the system; a function that is utilized by a separate component in standard cab suspensions.

Figure 7:
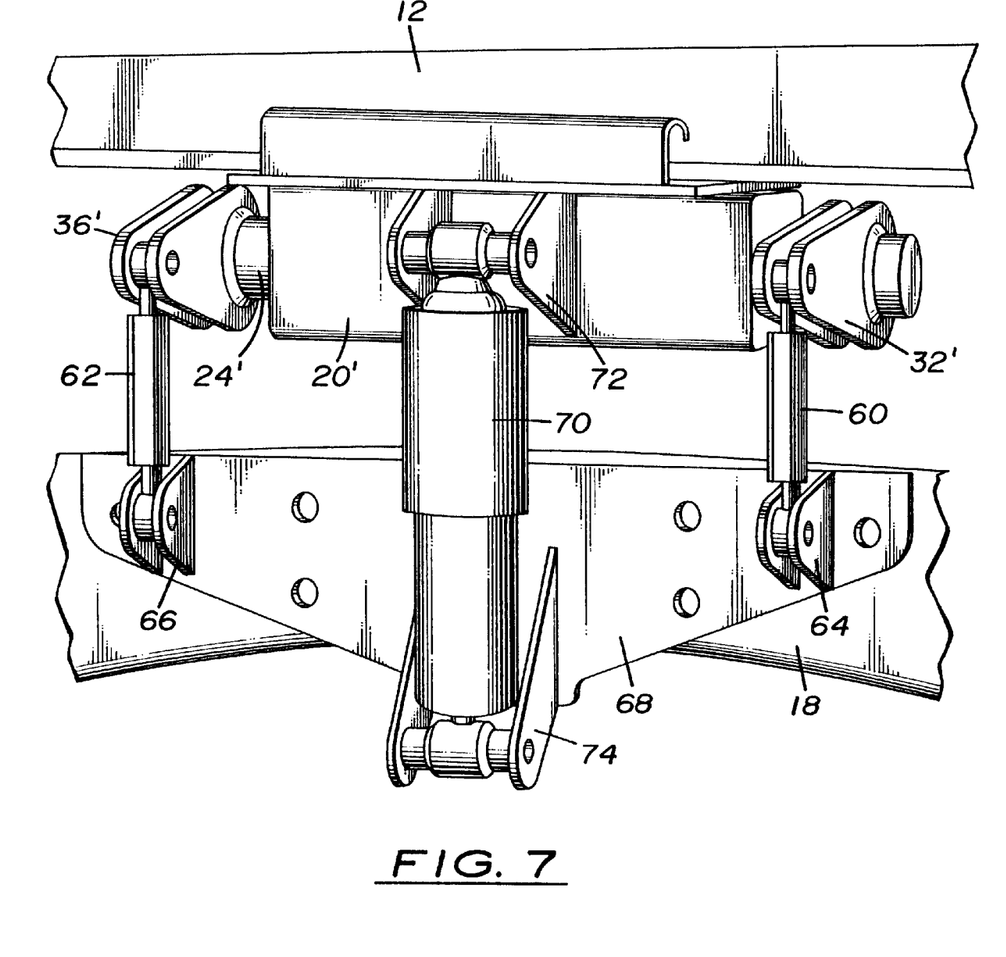
FIG. 7 is a rear perspective view of the modified form of the cab suspension system.

FIG. 7 is a rear perspective view of a modified form of the cab suspension system of this invention. The primary difference between the embodiment of FIG. 7 and that illustrated in FIGS. 1–6 is that the lever arms 32' and 36' extend rearwardly from the torsion bar 24'. In the embodiment of FIG. 7, adjustable turnbuckles 60 and 62 are pivotally connected at their upper ends to the rearward ends of the lever arms 32' and 36', respectively. The lower ends of the adjustable turnbuckles 60 and 62 are secured to a pair of brackets 64 and 66, respectively, as illustrated in FIG. 7. As seen in FIG. 7, the brackets 64 and 66 extend rearwardly from a plate 68 which is secured to the cross-member 18. The upper end of a shock absorber 70 is connected to a bracket 72 which is secured to the housing 20'. The lower end of a shock absorber 70 is secured to a bracket 74 which extends rearwardly from the plate 68.

The suspension system illustrated in FIG. 7 performs the same function as that described hereinabove, except that the adjustable turnbuckles 60 and 62 enable the vertical adjustment of the lever arms 32' and 36' with respect to the frame and cab of the vehicle. Although a single shock absorber 70 is illustrated in FIG. 7, a pair of shock absorbers could be utilized. The shock absorber 70, in addition to providing further suspension for the vehicle cab, also provides lateral stability to the suspension system.

Figure 8:
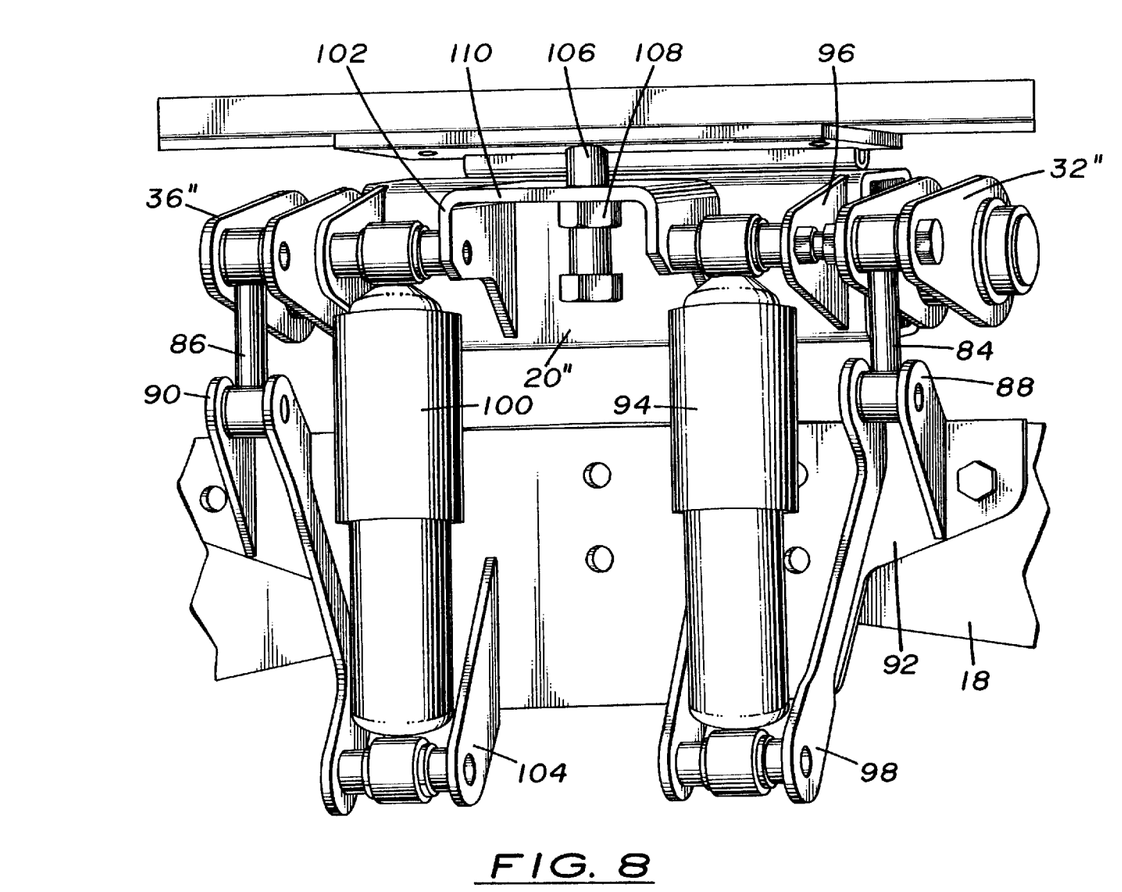
FIG. 8 is a rear perspective view of yet another modified version of the cab suspension system.
Figure 9:
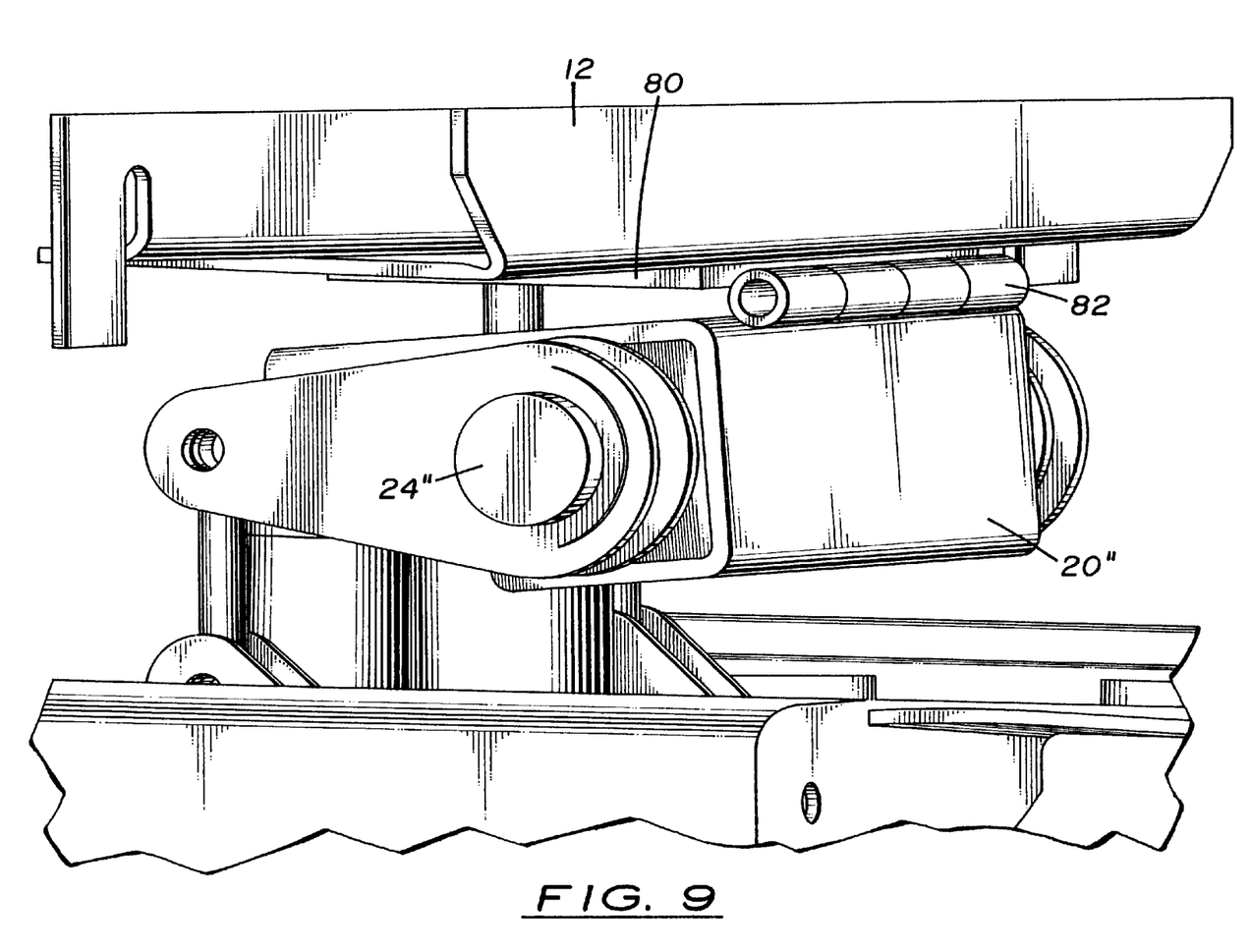
FIG. 9 is a rear perspective view of the embodiment of FIG. 8.

FIGS. 8 and 9 illustrate yet another embodiment of the vehicle cab suspension system. As seen in FIG. 9, a support plate 80 is secured to the cab 12 and has a hinge 82 at its forward end which is also secured to the housing 20". The lever arms 32" and 36" extend rearwardly from the torsion bar 24" and have links 84 and 86 pivotally secured to the rearward ends thereof. The lower ends of the links 84 and 86 are pivotally secured to brackets 88 and 90 which are secured to plate 92 which is, in turn, secured to the cross-member 18. A first shock absorber 94 has its upper end secured to a bracket 96 which extends rearwardly from housing 20" and has its lower end secured to a bracket 98 which extends rearwardly from the plate 92. Similarly, the upper end of shock absorber 100 is connected to a bracket 102 which extends rearwardly from housing 20" with the lower end thereof being secured to a bracket 104 which extends rearwardly from plate 92. An adjustment bolt 106 threadably extends upwardly through a nut 108 welded to the underside of plate 110 so that the upper end thereof is adapted to engage the underside of the plate 80 to provide an adjustment between the suspension system, the frame and the cab. Although a pair of shock absorbers 94 and 100 have been illustrated in FIGS. 8 and 9, a single shock absorber could be utilized if desired. The shock absorbers not only provide a dampening effect to the movement of the suspension system, but also provide lateral stability to the suspension system. The links 84 and 86 also provide lateral control or stability to the suspension system.

Thus it can be seen that a novel vehicle cab suspension system has been provided which accomplishes at least all of its stated objectives.

We claim:

1. A cab suspension for a vehicle having an elongated chassis supporting a cab having rearward and forward ends, said cab being supported on said chassis at a forward location and at a rearward location so as to permit vertical movement of said cab relative to said chassis, comprising:

a support structure connecting said cab to said chassis at one of said rearward and forward locations for providing relative vertical movement therebetween;

said support structure comprising an elongated tube, having opposite ends, and having its longitudinal axis disposed transversely with respect to the longitudinal axis of said chassis;

first means operatively securing said tube to said chassis;

said tube having an elongated, resilient cartridge means positioned therein;

an elongated bar means extending through said cartridge means and being in engagement therewith whereby said cartridge means restricts rotational movement of said bar with respect to said tube;

said bar means having opposite end portions positioned outwardly of said opposite ends of said tube;

a first lever arm, having opposite ends, secured at one of its ends to one end of said bar means and extending transversely with respect to the longitudinal axis of said bar means;

a second lever arm, having opposite ends, secured at one of its ends to the other end of said bar and extending transversely with respect to the longitudinal axis of said bar means;

said other ends of said first and second lever arms being secured to said cab for movement therewith at said location;

said other ends of said first and second lever arms being operatively selectively vertically adjustably secured to said cab.

2. The cab suspension of claim 1 wherein said bar means comprises a torsion bar.

3. The cab suspension of claim 1 wherein said cartridge means comprises a rubber material.

4. The cab suspension of claim 1 wherein said tube is a square tube and wherein said cartridge has a square cross-section.

5. The cab suspension of claim 1 wherein a pair of spaced-apart said support structures connect said cab to said chassis.

6. The cab suspension of claim 1 wherein said first means comprises a first bracket secured to said tube, said first bracket being secured to said chassis.

7. The cab suspension of claim 1 wherein said cartridge is bonded to said bar.

8. A cab suspension for a vehicle having an elongated chassis supporting a cab having rearward and forward ends, said cab being supported on said chassis at a forward location and at a rearward location so as to permit vertical movement of said cab relative to said chassis, comprising:

a support structure connecting said cab to said chassis at one of said locations for providing relative vertical movement therebetween;

said support structure comprising an elongated tube, having opposite ends, and having its longitudinal axis disposed transversely with respect to the longitudinal axis of said chassis;

first means operatively securing said tube to said cab whereby said tube moves with said cab;

said tube having an elongated, resilient means positioned therein; an elongated bar means extending through said tube and being in operative engagement with said resilient means whereby said resilient means restricts rotational movement of said bar means with respect to said tube;

said bar means having opposite end portions positioned outwardly of said opposite ends of said tube;

a first lever arm, having opposite ends, secured at one of its ends to one end of said bar means and extending transversely with respect to the longitudinal axis thereof;

a second lever arm, having opposite ends, secured at one of its ends to the other end of said bar means and extending transversely with respect to the longitudinal axis thereof;

said other ends of said first and second lever arms being operatively selectively vertically adjustable secured to said chassis at said location.

9. The cab suspension of claim 8 wherein said bar means comprises a torsion bar.

10. A cab suspension for a vehicle having an elongated chassis supporting a cab having rearward and forward ends, said cab being supported on said chassis at a forward location and at a rearward location so as to permit vertical movement of said cab relative to said chassis, comprising:

a support structure connecting said cab to said chassis at one of said locations for providing relative vertical movement therebetween;

said support structure comprising an elongated tube, having opposite ends, and having its longitudinal axis disposed transversely with respect to the longitudinal axis of said chassis;

first means operatively securing said tube to said cab whereby said tube moves with said cab;

said tube having an elongated, resilient means positioned therein;

an elongated bar means extending through said tube and being in operative engagement with said resilient means whereby said resilient means restricts rotational movement of said bar means with respect to said tube;

said bar means having opposite end portions positioned outwardly of said opposite ends of said tube;

a first lever arm, having opposite ends, secured at one of its ends to one end of said bar means and extending transversely with respect to the longitudinal axis thereof;

a second lever arm, having opposite ends, secured at one of its ends to the other end of said bar means and extending transversely with respect to the longitudinal axis thereof;

said other ends of said first and second lever arms being operatively secured to said chassis at said location;

said first means including means for hingedly connecting said tube about a horizontal axis parallel to the longitudinal axis of said tube;

and means for adjusting the hinged position of said tube with respect to said cab.

11. The cab suspension of claim 10 wherein said cartridge means comprises a rubber material.

12. The cab suspension of claim 10 wherein said other ends of said lever arms are operatively vertically adjustably secured to said chassis.

13. The cab suspension of claim 12 wherein said other ends of said lever arms are operatively vertically adjustably secured to said chassis by length adjustable links.

14. The cab suspension system of claim 13 wherein each of said links comprises a turnbuckle means.

15. The cab suspension of claim 10 wherein a shock absorber means is connected to and extends between said tube and said chassis.

16. The cab suspension of claim 15 wherein a pair of shock absorber means are connected to and extend between said tube and said chassis.

17. The cab suspension of claim 10 wherein said lever arms extend transversely from said bar means.

18. The cab suspension of claim 10 further including a shock absorber means secured to and extending between said tube and said chassis.

* * * * *